H. B. DUTTON.
COOKER.
APPLICATION FILED MAY 16, 1919.
1,323,525.
Patented Dec. 2, 1919.
2 SHEETS—SHEET 2.
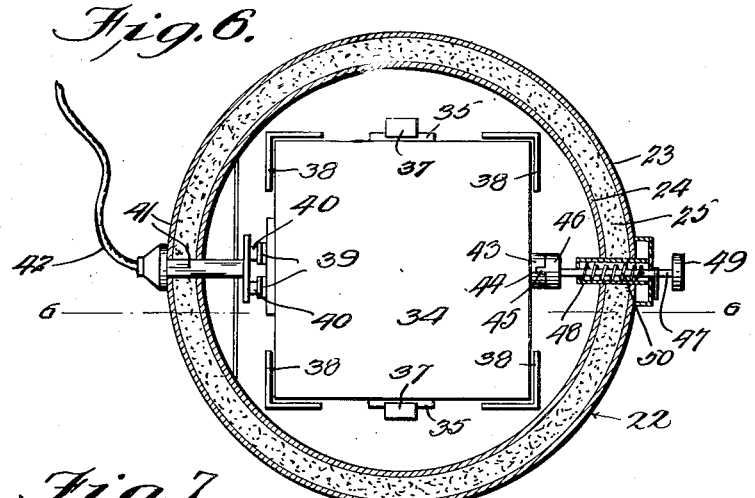
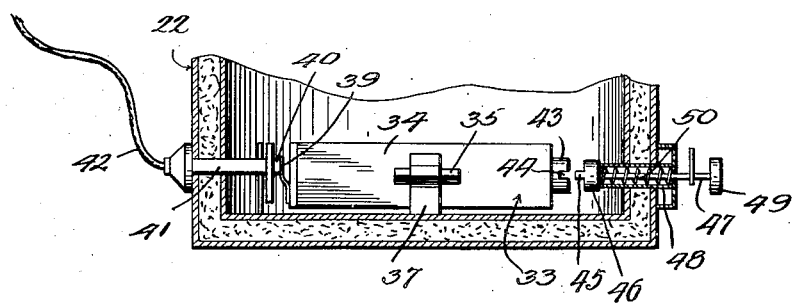
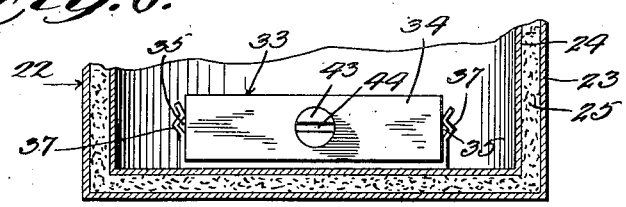
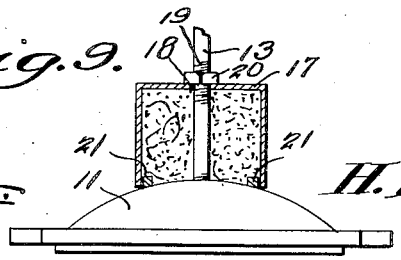
WITNESSES
INVENTOR
H. B. Dutton
BY
ATTORNEYS

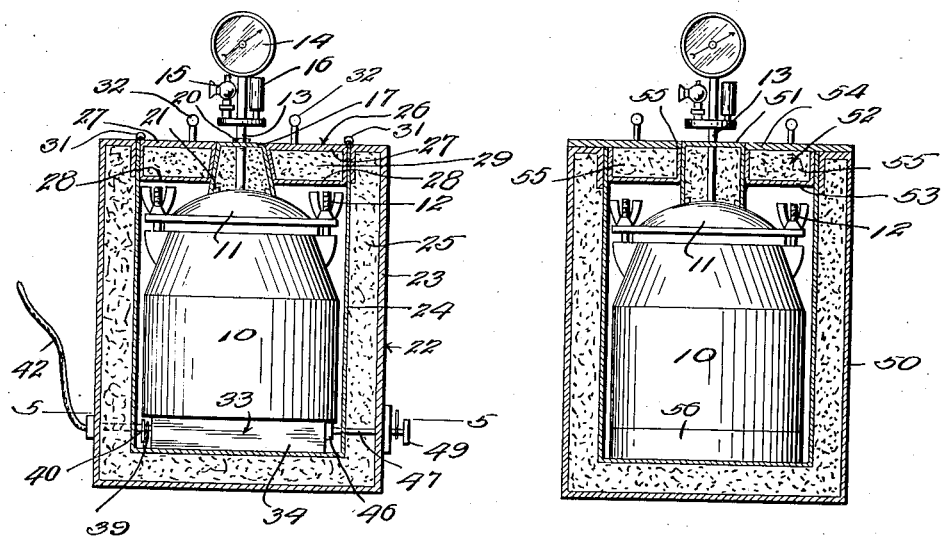
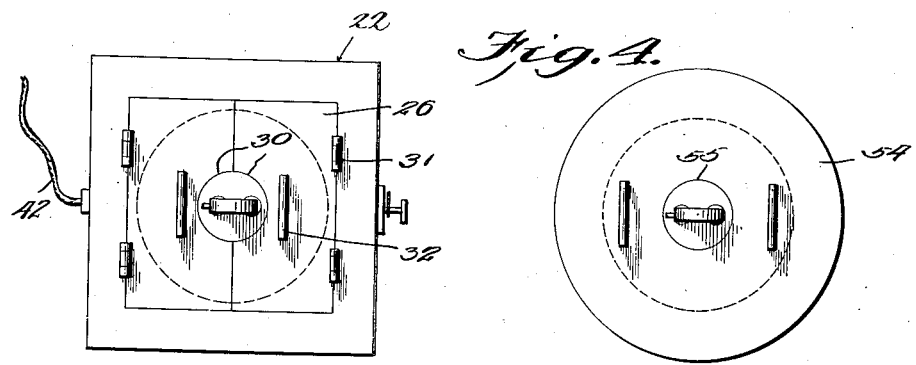
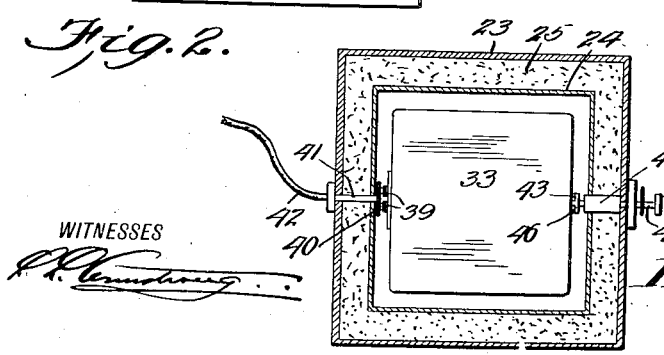

UNITED STATES PATENT OFFICE.

HOWARD BERNARD DUTTON, OF DENVER, COLORADO.

COOKER.

1,323,525.         Specification of Letters Patent.         Patented Dec. 2, 1919.

Application filed May 16, 1919. Serial No. 297,697.

*To all whom it may concern:*

Be it known that I, HOWARD B. DUTTON, a citizen of the United States, residing at Denver, in the county of Denver and State of Colorado, have invented certain new and useful Improvements in Cookers, of which the following is a specification.

My invention relates to improvements in cookers and canners.

An important object of the invention is to provide a cooker or canner having extreme economy and low cost of operation.

A further object of the invention is to provide a cooker and canner of the above mentioned character, embodying a pressure cooker element arranged within a heat insulating casing, together with means arranged within the heat insulating casing for heating the cooker.

A further object of the invention is to provide a device of the above mentioned character which is easy and convenient to operate and neat and attractive in appearance.

Other objects and advantages of the invention will be apparent during the course of the following description.

In the accompanying drawings forming a part of this specification and in which like numerals are employed to designate like parts throughout the same, Figure 1 is a central vertical sectional view through the outer heat insulating or retaining casing, associated elements being shown in elevation, Fig. 2 is a plan view of the device, Fig. 3 is a central vertical sectional view through a different form of apparatus, the pressure cooker being shown in elevation, Fig. 4 is a plan view of the same.

Fig. 5 is a horizontal section taken on line 5—5 of Fig. 1,

Fig. 6 is a similar view, the outer casing being shown circular,

Fig. 7 is a section through the outer casing, taken on line 6—6 of Fig. 6, the heating element being shown in elevation, Fig. 8 is an elevation of the heating element, taken at a right angle to the showing of Fig. 7, and, Fig. 9 is a detail section through the heat insulating cover element.

In the drawings, wherein for the purpose of illustration is shown a preferred embodiment of my invention, the numeral 10 designates the body portion of a hermetically sealed or closed pressure cooker, which may be formed of any suitable material. The upper end of the body portion 10 is closed by a cover 11, adapted to be held upon such upper end by bolts 12, to form a steam tight joint. This cover is removed for the purpose of introducing the water and food stuffs to be cooked into the body portion 10.

In each form of the invention, Figs. 1 and 3, a vertical pipe 13, as shown more clearly in Fig. 9, has screw-threaded engagement within an opening formed in the central portion of the cover 11. This pipe is equipped with a steam gage 14, a manually operated pet-cock 15, and a pressure relief or regulating valve 16, which may be set to exhaust the steam at any desired pressure.

In Fig. 1, the numeral 17 designates the outer casing of a cover element, which is preferably formed of aluminum, and may be filled with heat insulating material such as mineral wool. As shown in Fig. 9, the outer casing 17 is provided in its top with an opening 18, for the passage of the pipe 13, this pipe being screw-threaded at 19, to receive a nut 20, serving to clamp the casing 17 to the cover 11, with an annular flange 21 arranged within the lower end of the casing, this flange being rigidly secured to the cover 11. It is thus seen that the cover element is permanently secured to the cover 11, and is a heat insulating or retaining member. The cover element, in Fig. 1, is tapered, increasing in diameter downwardly.

In Figs. 1, 2, 6, 7 and 8, the numeral 22 designates an outer heat insulating or retaining casing, which receives the steam pressure cooker element therein. This outer casing is shown as square in cross-section, Fig. 2, and circular, Fig. 6, but the invention is in no sense restricted to this idea. This outer casing embodies an outer shell 23, which is preferably formed of steel, and an inner shell 24, preferably formed of aluminum, these shells being suitably spaced for providing a chamber which is preferably filled with mineral wool 25.

The top of the outer casing 22 is formed open and is adapted to be covered by lids or covers 26, formed of spaced members 27 and 28, and the space or chamber between these members is filled with mineral wool 29. The member 27 is preferably formed of steel while the inner member 28 is preferably formed of aluminum. The covers or lids 26 are provided at their inner edges with curved openings or recesses 30, which are semi-circular and form a tapered opening increasing in diameter downwardly. The openings or opening 30 snugly receive the cover element 17. The covers or lids 26 are hinged to the outer casing 22, as shown at 31, and are adapted to be swung upwardly, by handles 32. When the covers 26 are in the closed position, they coöperate with the casing 22 and cover element 17, for forming a tight joint for completely closing the upper end of the casing 22, thereby preventing the escape of heat from the same.

Arranged within the lower portion of the casing 22 is an electric heating element 33, of any well known or preferred construction, and including an outer casing 34, serving to support the steam pressure cooker element 10. The casing 34 when in the circular casing 22, is provided upon its opposite sides with beveled lugs 35, adapted for engagement with spring clips 37, secured to the bottom of the casing 22, and serving to prevent displacement of the heating element. Corner brackets 38 are also secured to the bottom of the outer casing 22 and receive the corners of the heating element 33.

The heating element 33 is provided with terminals 39, for electrical contact with terminals 40, carried by a plug 41, in turn having connection with a cable 42. It is obvious that any suitable means may be employed to supply current to the heating element. The numeral 43 designates a rotatable element included in a switch (not shown) arranged within the casing 34, and serving to regulate the amount of heat generated by the heating element. This rotatable element is provided with a groove 44 to receive a tongue 45, carried by a coacting rotatable element 46. This coacting rotatable element is rigidly secured to the inner end of a rod 47, extending through a tube 48, and provided at its outer end with a handle 49, by which the rod may be turned. The rotatable element 46 is moved inwardly by a spring 50. It is thus seen that the handle 49 may be employed to adjust the heat regulating switch of the heating element 33.

In Figs. 3 and 4, the device is provided with an outer casing 50, which is double walled and filled with heat insulating material. This outer casing 50 is identical with the outer casing 22, except that the casing 50 is cylindrical.

The steam pressure cooker element 10 is arranged within the outer casing 50 and its cover 11 is equipped with a heat insulating cover element 51, identical with the cover element 17, except that it is cylindrical. An annular cover 52 is adapted for insertion between the element 51 and the outer casing 50, and this annular cover embodies an inner shell 53, and an outer plate 54, providing a space therebetween for receiving a filling 55, of mineral wool. The plate 54 is provided with a central opening 55 to receive the element 51, and this plate projects radially beyond the inner shell 53, and constitutes the flange to engage with the top of the casing 50.

The numeral 56 designates a heating element, which may be metal or soap-stone radiator.

In the use of the device shown in Figs. 1 and 2, the covers 26 may be swung to the open position, which will permit of the steam pressure cooker element, containing the food stuff and water, to be introduced into the outer heat insulating casing 22. This having been done, the upper end of this outer casing is completely closed by swinging the covers 26 to the inner or closed position. The current may then be turned on and the heating element 33 will radiate the proper heat. The material within the steam pressure cooker element is subjected to a cooking action in the presence of steam under suitable pressure, which pressure may rise as high as thirty pounds to the square inch if desired. The advantages of cooking under pressure are well known. The outer heating insulating casing prevents the escape or dissipation of the heat from the heating element 33, and the steam pressure cooking element. It is thus seen that my device embodies the advantages of the steam pressure cooker and fireless cooker.

The operation of the second form of the invention is so similar to that of the first, that it is unnecessary to state the same.

It is be understood that the forms of my invention herewith shown and described are to be taken as preferred examples of the same, and that various changes in the shape, size, and arrangement of parts may be resorted to without departing from the spirit of my invention or the scope of the subjoined claims.

Having thus described my invention, I claim:

1. Apparatus of the character described, comprising an outer heat insulating casing having its upper end opened, heat insulating covers pivotally connected with the upper open end of the casing and provided at their inner edges with recesses, a steam pressure cooker element having a cover, a pipe connected with the cover, a heat insulating cover element carried by said cover and embodying a casing having an opening for the passage of the pipe, a ring rigidly secured to the cover of the cooker element and entering the lower end of the last named casing, a nut having screw-threaded engagement with the pipe and engaging the top of the last named casing, a pressure gage carried by the pipe, and a heat radiating element arranged within the outer casing.

2. Apparatus of the character described, comprising a heat insulating outer casing, a heating element arranged in the lower portion thereof, members secured to the outer casing and engaging the heating element, means to supply current to the heating element, a rotatable switch element carried by the heating element, a coacting rotatable switch element to engage and disengage the first named switch element, a rod carrying the second named switch element and extending to the exterior of the outer casing, means to turn the rod, a spring to move the rod inwardly, and a steam pressure cooker element arranged within the outer casing.

3. Apparatus of the character described, comprising a heat insulating outer casing, a steam pressure cooker element arranged within the outer casing and having a lid, a heat insulating cover element carried by the lid, a pipe connected with the lid and passing through the heat insulating cover element, a cover for the outer casing, and a heat insulating member carried by the last named cover and having an opening to receive the heat insulating cover element.

4. Apparatus of the character described, comprising a heat insulating outer casing, a steam pressure cooker element arranged within the heat insulating outer casing and including a casing and a lid to engage the end of the casing and formed therewith a gas tight joint, means to clamp the lid to its casing so that a pressure far in excess of atmospheric pressure may be maintained within the steam pressure cooker element casing, and a heating element arranged within the outer casing.

HOWARD BERNARD DUTTON.